(12) United States Patent
Mossip

(10) Patent No.: US 6,637,601 B2
(45) Date of Patent: Oct. 28, 2003

(54) FLUTED STATIC STACK AGITATOR

(76) Inventor: Timothy Donald Mossip, 82 Briscoe St. W., London, Ontario (CA), N6J-1M5

( * ) Notice: Subject to any disclaimer, the term of this patent is extended or adjusted under 35 U.S.C. 154(b) by 0 days.

(21) Appl. No.: 10/181,257

(22) PCT Filed: Jan. 16, 2001

(86) PCT No.: PCT/CA01/00029

§ 371 (c)(1),
(2), (4) Date: Jul. 16, 2002

(87) PCT Pub. No.: WO01/52967

PCT Pub. Date: Jul. 26, 2001

(65) Prior Publication Data

US 2003/0000885 A1 Jan. 2, 2003

(30) Foreign Application Priority Data

Jan. 17, 2000 (CA) .............................................. 2296167

(51) Int. Cl.[7] .......................... B01D 35/22; B01D 29/86
(52) U.S. Cl. ....................... 210/407; 210/223; 366/336; 366/340
(58) Field of Search ................................ 210/223, 407; 366/336, 340

(56) References Cited

U.S. PATENT DOCUMENTS

| 2,391,110 | A | * | 12/1945 | Walker |
| 3,387,712 | A | * | 6/1968 | Schrink |
| 3,417,967 | A | * | 12/1968 | Richens et al. |
| 4,067,810 | A | * | 1/1978 | Sullivan |
| 4,176,797 | A | | 12/1979 | Kemp |
| 4,842,747 | A | | 6/1989 | Dragasevich |
| 4,976,546 | A | * | 12/1990 | Beattie |
| 5,217,610 | A | * | 6/1993 | McClain et al. |
| 5,516,278 | A | | 5/1996 | Morrison |
| 5,547,281 | A | * | 8/1996 | Brooks |

OTHER PUBLICATIONS

WPI Database abstract XP002165235

* cited by examiner

Primary Examiner—Thomas M. Lithgow
(74) Attorney, Agent, or Firm—Anissimoff & Assoc.; Hans Koenig

(57) ABSTRACT

An agitator assembly for use within a sieve during automotive painting and cleaning operations has flutes consisting of circular conical discs aligned within the sieve by means of a magnetized cylinder extending through the flute or by means of a collar attached to said flute.

17 Claims, 3 Drawing Sheets

FLUTED STATIC STACK AGITATOR

CROSS-REFERENCE APPLICATION

This application is a PCT National Phase Entry under 35 U.S.C. 371 of international application number PCT/CA01/00029 filed on Jan. 16, 2001.

BACKGROUND OF THE INVENTION

1. Field of the Invention

The present invention relates to apparatus for handling and filtering paint during paint operations and in particular, relates to the cleaning of such paint equipment and apparatus used in the automotive industry.

2. Prior Art

In the art of painting automobiles, paint is conveyed from a large holding tank and passed through a filter canister and paint booth prior to being either manually or mechanically applied to the automobile. The paint is filtered as it passes through the filter canister. The filter canister contains a metal sieve in which a filter bag is placed. The canister top is designed such that the paint flowing into it is directed downwardly into the sieve opening. With this type of arrangement, the flow of the paint through the sieve results in an accumulation of paint sludge along the interior walls of the canister.

The paint sludge is problematic for various reasons. For example, the paint sludge may clot or coagulate, often dislodging from the walls with the consequent risk of clogging the Teflon tubes that convey the paint to the applicator and interfering with the paint flow therethrough. In addition, metal shards within the sludge can be released into the system and puncture the Teflon tubing. Such problems lead to decreased production due to both scheduled and unscheduled maintenance.

Additionally, when a change of colour is mandated during paint operations, a solvent is flushed through the entire system at approximately 1.0–1.7 MPa for several days. The solvent is conveyed through the system in a way similar to the paint. The main flow of the solvent is directed through the vertical height of the sieve. However, the high pressure flow of solvent makes inefficient contact with the accumulated sludge formed on the canister walls. If the sludge is not properly removed in its entirety, contamination of the new colour of paint may result.

Various mechanical methods are also employed to clean the interior walls of the filter canister. The walls are typically scoured with a brush. However, this cleaning method may result in bristles falling off the brush and being subsequently introduced into the paint system. Obviously, bristles inadvertently sprayed onto a vehicle must be removed resulting quality problems and production downtime. Cloth rags are also used as a means to clean the filter canister. However, the use of cloth rags may lead to the introduction of lint deposits into the paint system that also similarly lead to paint defects. Moreover the use of either a brush or a cloth rag requires maintenance personnel to directly expose their hands and arms to the solvent's harsh chemicals.

U.S. Pat. No. 4,176,797 (Kemp) discloses a fluid mixer and comminuter for paint. The apparatus is used in the mixing of paint stored in conventional paint cans. The apparatus includes an elongated rod having an axis and a pair of discs, at least one of the discs having perforations therethrough adjacent to the rod. Rotation of the rod at high speed causes the paint to enter through the perforations and subsequently be forced radially outwardly from between the discs, thereby promoting mixing of the paint. The apparatus is not used in the removal of debris from paint and does not include a sieve or filter canister, as in the present invention.

BRIEF SUMMARY OF THE INVENTION

The present invention is intended to overcome the disadvantages associated with the prior art cleaning methods mentioned above. As such, an object of the present invention is to provide a simple, inexpensive yet effective device for cleaning the walls of a filter canister.

This object is achieved by providing a fluted stack agitator assembly for placement into the sieve located in the paint canister. The stack agitator includes a cylindrical magnet within its cylindrical body. Conical flutes are circumferentially attached to the exterior of the cylindrical body. The flutes contain apertures or holes which are vertically misaligned with respect to one another such that the apertures are vertically staggered. The magnet which is inserted into the hollow cylinder body is secured in place by a metal screw that is threadingly engaged into the top of the magnet. The screw has an integrally formed handle that permits the manipulation of the assembled device. Thus, when cleaning solvent passes through the system, the flutes re-direct the flow of the solvent to the walls of the canister in the manner hereinafter described to achieve better cleaning thereof.

An additional object of the present invention is to provide an assembly which prevents the accumulation of sludge within the canister during painting operations. When used without the magnet, the stack agitator assembly according to this invention may be installed within the sieve and canister to re-direct the paint flow towards the sides of the canister. This assists in preventing the build-up of sludge along the walls.

Accordingly, there is provided an apparatus for removing debris from painting fluids comprising a cylindrical canister having a fluid inlet and fluid outlet. The canister means has a longitudinal axis substantially parallel to the flow direction of the fluid. A cylindrical filter is concentrically located within the canister for collecting debris from the fluid upon passage of the fluid therethrough. An agitator assembly is concentrically located within the filter and includes a support means having at least a conical flute attached thereto and oriented substantially transversely to the flow direction. The flute has apertures for passage of at least a portion of the fluid therethrough. The flute redirects a portion of the fluid against the filter or canister to thereby remove collected debris. The painting fluids may be either paint or solvents used to clean the apparatus. The support means may include a magnet for collection of metallic debris.

The various features of novelty which characterize the invention are pointed out with more particularity in the claims annexed hereto and forming a part of this disclosure. For a better understanding of the invention, its operating advantages and specific objects attained by its use, reference should be made to the accompanying drawings and descriptive matter in which there are illustrated and described a preferred embodiment of the invention.

DETAILED DESCRIPTION OF THE INVENTION

Turning to the preferred embodiment illustrated in the Figures, the stack agitator assembly according to the present invention comprises a hollow cylindrical body (1) having integrally formed flutes (2) on the exterior thereof. The diameter of the cylindrical body (1) is sufficient to receive a cylindrical magnet (3) as further described hereinafter. When assembled, the stack agitator consisting of the hollow cylinder body (1) and the cylindrical magnet (3), has an approximate height corresponding to the height of the sieve (4) for placement within a paint canister (not shown). The diameter of flutes of the stack agitator are dimensioned to be slightly less than the diameter of the sieve in order to be placed therein.

Figure 1:
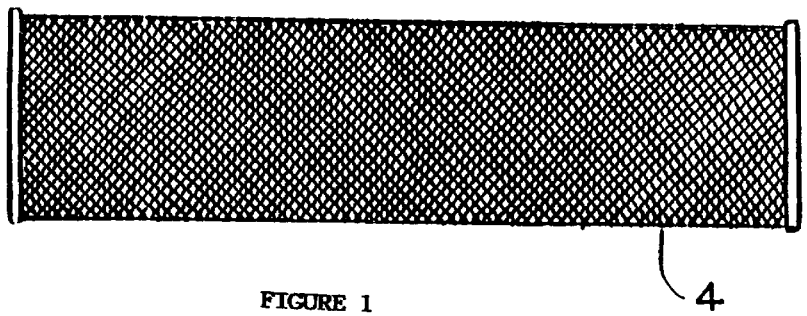
FIG. 1 is a plan view of a sieve having a circular diameter.
Figure 2:
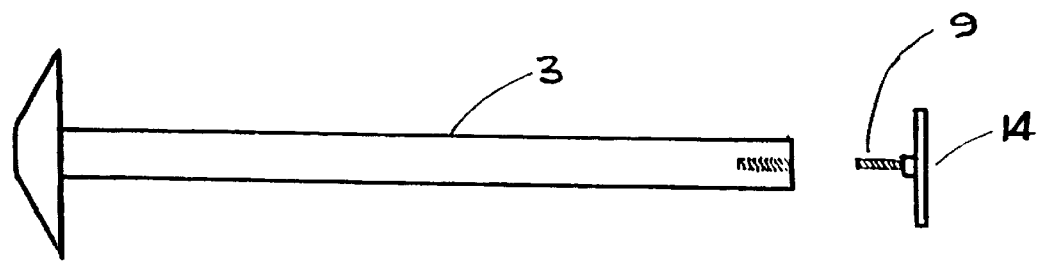
FIG. 2 is a plan view of the cylindrical magnet and accompanying securement screw with handle.
Figure 3:
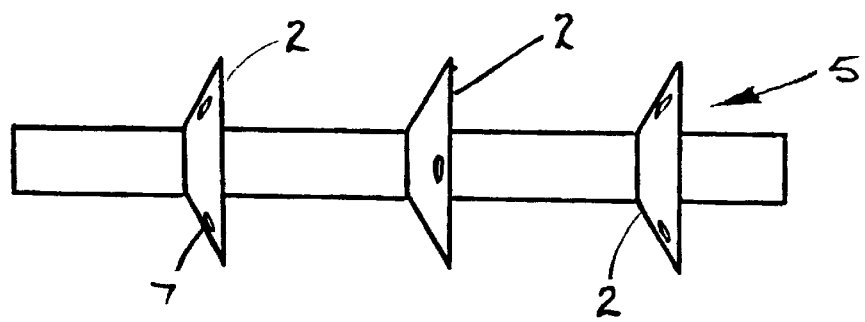
FIG. 3 is a plan view of the stack agitator consisting of a hollow cylinder with flutes.

Preferably, the flutes (3) are circular and conical in shape and have a diameter that allows a 0.64 cm spacing between their extremity and the interior of the sieve (4). When placed within the sieve, the concave side (5) of the flute (2) faces upwardly to meet the flow of the solvent as shown in FIG. 3. Typically, the flutes (2) are circular conical discs which are typically attached to the cylinder body by means of spot welding. The apertures or holes (7) are typically 1.27 cm in diameter and arrayed upon the flutes so that no one aperture is immediately below the one above. In other words, the apertures (7) are preferably staggered in a vertical direction. In the preferred embodiment shown, the cylindrical body of the stack agitator contains three flutes and three apertures per flute. However, the number of flutes and apertures can be varied without departing from the spirit of the invention.

To assemble the stack agitator, the solid cylindrical magnet (3) is inserted within the hollow cylinder body (1). An integrally formed base flute (8) is provided and suitably attached at one end of the cylindrical magnet. This base flute (8) is concave but contains no holes or apertures. A metal screw (9), having a handle (14), is threadingly engaged into the other longitudinal end of the magnet which is adapted to receive the screw. The handle on the screw allows for the manipulation of the assembled device and for the securement of the magnet within the cylindrical body of the stack agitator in abutment against the base flute (8).

In use, solvent is directed into the sieve now containing the stack agitator. The flow is impeded and diverted towards the canister walls (not shown) by the flutes (2). The flutes (2) are arranged so that the concave side faces to meet the solvent flow. The vertically staggered apertures permit the solvent to pass through, under pressure, to the next lower stage where the solvent is again deflected with a portion passing through the second stage of apertures. In this way, with the use of multiple flutes, the solvent is efficiently brought in contact with the interior of the canister (not shown) to thereby clean it.

Figure 4:
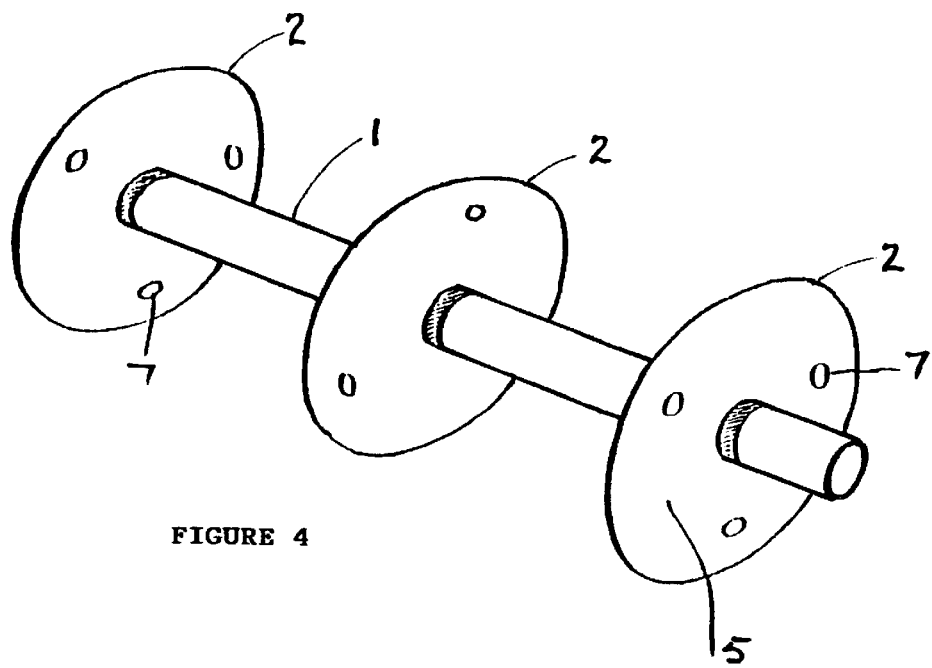
FIG. 4 is perspective view of the stack agitator consisting of a hollow cylinder with flutes.

Referring to FIGS. 3 and 4, an alternative embodiment of the invention is essentially disclosed. The stack agitator disclosed comprises a solid cylindrical body with two or three integrally formed concave flutes formed thereon. One flute is located near the top and one at the base of the tube. The top flute contains three half inch holes. This alternate embodiment is designed for use during normal paint operations when paint is flowing through the system and the absence of the use of the magnet is to be noted in this application.

The agitator is placed into the filter bag in place within the sieve of the filter pipe. As paint passes through the system, some of the flow is deflected off the flutes and directed towards the walls of the canister. By forcing the paint to aggressively contact the walls of the canister the amount of sludge that accumulates is reduced.

Figure 5:
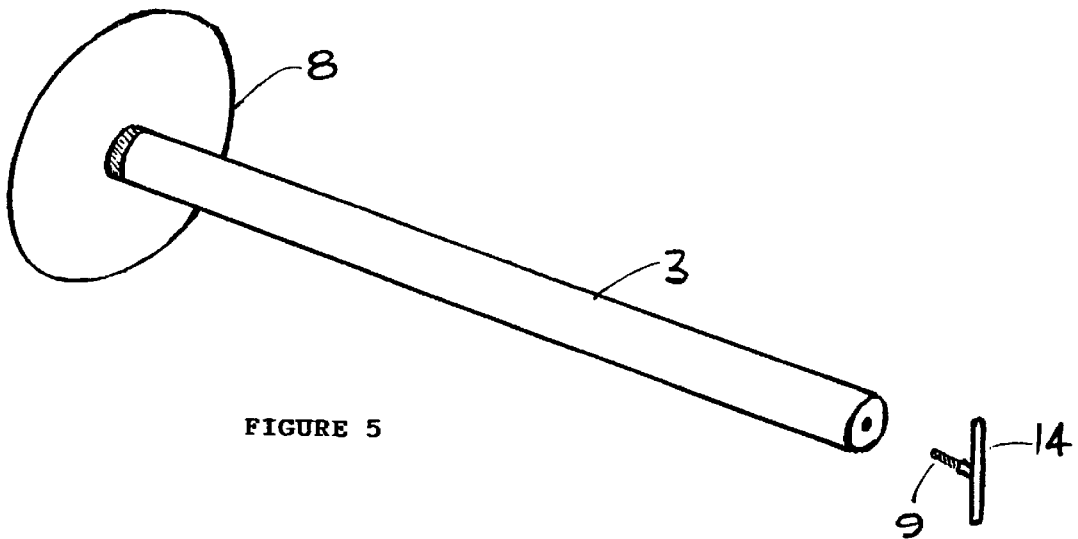
FIG. 5 is a perspective view of the cylindrical magnet and accompanying securement screw with handle.
Figure 6:
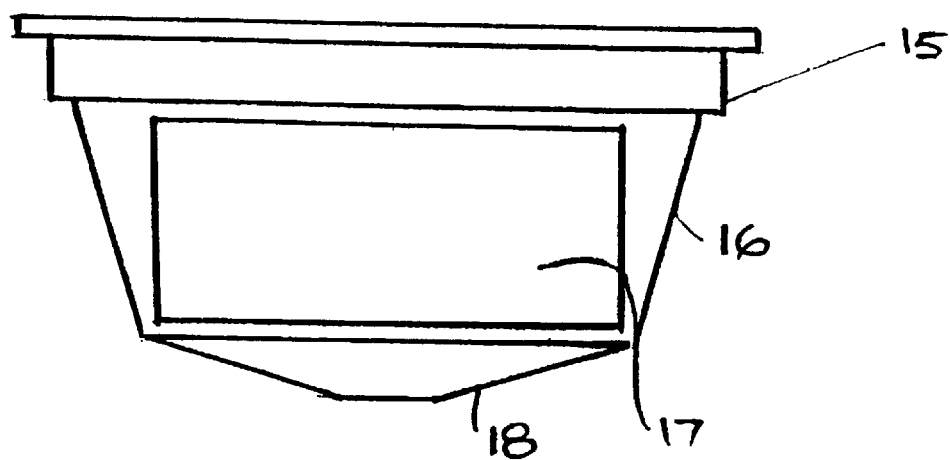
FIG. 6 is a side view of the collar type agitator.
Figure 7:
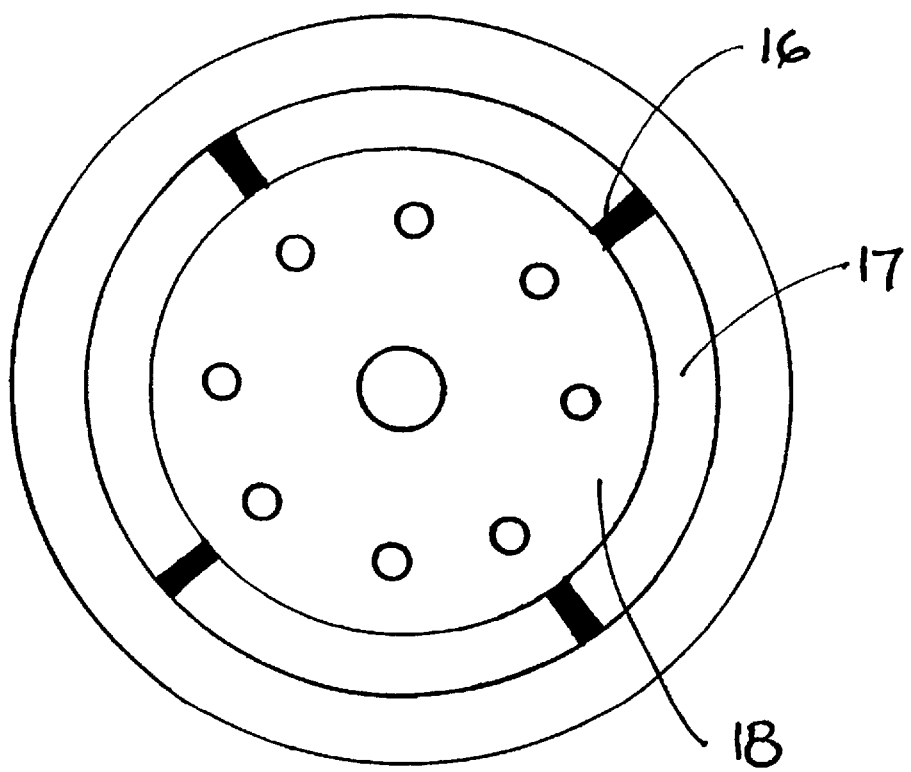
FIG. 7 is a top view of the collar type agitator.

Referring to FIGS. 5 and 6, yet another embodiment of the invention is disclosed for use during normal paint operations. The use of this embodiment is analogous to the use of the embodiment described with reference to FIGS. 3 and 4. Instead of placement of the stack agitator within the filter bag, a collar type agitator is placed and fitted within the top opening of a typical filter bag.

The collar type agitator has the appearance of a basket having a circular collar (15) dimensioned to fit securely within a filter bag. The collar has inwardly and downwardly tapering sides (16) and circumferentially spaced rectangular apertures (17) formed therein. The basket has a bottom (18) having circular apertures formed therein as well. In the embodiment shown 4 side apertures are disclosed and 6 circular apertures are shown on the bottom as well as a central aperture of a larger diameter.

In use, the collar is placed within the filter bag as described and the paint passes under pressure through the various apertures with the result that the amount of sludge formed on the canister walls in thereby reduced.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features and sub-combinations. This is contemplated by and is within the scope of the claims.

Since many possible embodiments may be made of the invention without departing from the scope of the thereof, it is to be understood that all matter herein set forth or shown in the accompanying drawings is to be interpreted as illustrative and not in a limiting sense.

What is claimed is:

1. An apparatus for removing debris from painting fluids comprising: a cylindrical canister means having a fluid inlet and fluid outlet, said canister means having a longitudinal axis substantially parallel to the flow direction of said fluid; a cylindrical filter means concentrically located within said canister means for collecting debris from said fluid upon passage of said fluid therethrough; an agitator assembly concentrically located within said filter means, said agitator assembly including a support means (1, 15) having at least a conical flute (2, 18) attached thereto and oriented substantially transversely to said flow direction, said flute (2, 18) having apertures (7) for passage of at least a portion of said fluid therethrough.

2. The apparatus as claimed in claim 1, wherein said painting fluid includes a solvent for cleaning said apparatus.

3. The apparatus as claimed in claim 2, wherein said filter means comprises a sieve element (4).

4. The apparatus as claimed in claim 3, wherein said support mean comprises a hollow cylindrical body (1).

5. The apparatus as claimed in claim 4, wherein said support means comprises a magnetic element (3).

6. The apparatus as claimed in claim 5, wherein said flute (2, 18) is magnetized by means of said magnetic element (3).

7. The apparatus as claimed in claim 6, wherein said flute (2, 18) has a concave side (5) facing said flow direction.

8. The apparatus as claimed in claim 7, wherein said flute (2, 18) redirects a portion of said fluid against said sieve element (4).

9. The apparatus as claimed in claim 7, wherein said flute (2, 18) redirects a portion of said fluid against said canister means.

10. The apparatus as claimed in claims 3, wherein said support mean comprises a collar (15) having tapering sides (16).

11. The apparatus as claimed in claim 10, wherein said flute (2, 18) has a concave side (5) facing said flow direction.

12. The apparatus as claimed in claim 11, wherein said flute (2, 18) redirects a portion of said fluid against said sieve element (4).

13. The apparatus as claimed in claim 11, wherein said flute (2, 18) redirects a portion of said fluid against said canister means.

14. An agitator assembly for use within a sieve during painting and cleaning operations, said sieve having a longitudinal axis, said agitator comprising: at least one flute having a circumference, a centrally located hole, and apertures formed therein; and, a cylindrical element attached to the flute and partially extending through the centrally located hole to maintain the flute substantially at right angles to the longitudinal axis, the cylindrical element containing a magnetic core.

15. The agitator assembly as claimed in claim 14, wherein said flutes are conical disks and wherein said apertures are circular holes.

16. The agitator assembly as claimed in claim 14, wherein said flute is magnetized.

17. An agitator assembly for use within a sieve during painting and cleaning operations, said sieve having a longitudinal axis, said agitator comprising: at least one flute having a circumference, a centrally located hole, and apertures formed therein; and, a circular collar having downwardly extending substantially vertical walls attached at the bottom thereof at the circumference of said flute to maintain said flute substantially at right angles to the longitudinal axis.

* * * * *